US010774874B2

(12) United States Patent
Binion et al.

(10) Patent No.: US 10,774,874 B2
(45) Date of Patent: Sep. 15, 2020

(54) FLUID BEARING ASSEMBLY

(71) Applicant: General Electric Company, Schenectady, NY (US)

(72) Inventors: Sean Christopher Binion, Loveland, OH (US); Steven Douglas Johnson, Milford, OH (US); David Vickery Parker, Middleton, MA (US); Stephen Joseph Waymeyer, Batavia, OH (US); Nathan Evan McCurdy Gibson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 16/055,333

(22) Filed: Aug. 6, 2018

(65) Prior Publication Data
US 2020/0040940 A1 Feb. 6, 2020

(51) Int. Cl.
*F16C 32/06* (2006.01)
*F01D 25/16* (2006.01)
(Continued)

(52) U.S. Cl.
CPC .......... *F16C 32/0625* (2013.01); *F01D 25/16* (2013.01); *F01D 25/183* (2013.01);
(Continued)

(58) Field of Classification Search
CPC .... F16C 17/12; F16C 29/025; F16C 32/0614; F16C 32/0525; F16C 43/02; F16C 33/1085; F16C 33/6659; F16C 37/002; F16C 2360/24; F01D 25/16; F01D 25/22; F01D 25/183; F02C 7/06; F05D 2240/50;
(Continued)

(56) References Cited

U.S. PATENT DOCUMENTS 2,953,416 A * 9/1960 Collins ................... F16C 33/10
384/251
3,610,365 A 10/1971 Maddox
(Continued)

FOREIGN PATENT DOCUMENTS

| EP | 3045697 A1 * | 7/2016 | ............. F25B 9/004 |
| GB | 1288869 A * | 9/1972 | ............. F16C 29/025 |
| WO | WO-2006016162 A1 * | 2/2006 | .......... F15B 15/1476 |

OTHER PUBLICATIONS

Howard et al., Integration Methodology for Oil-Free Shaft Support Systems: Four Steps to Success, NASA/TM-2010-216827, 8th International Conference of Rotor Dynamics, IFToMM, Seoul, Korea, Sep. 12-15, 2010, pp. 15.

*Primary Examiner* — Marcus Charles
(74) *Attorney, Agent, or Firm* — Dority & Manning, P.A.

(57) ABSTRACT

A bearing assembly including a body defining an outer surface, an inner surface, and an aft surface is generally provided. A first inlet opening is defined through the outer surface in fluid communication with a first internal passage defined by a first internal wall. The first internal passage is in fluid communication with a first outlet opening defined through the inner surface. A second inlet opening is defined through the inner surface in fluid communication with a second internal passage defined by a second internal wall. The second internal passage is in fluid communication with a second outlet opening defined through the aft surface.

20 Claims, 10 Drawing Sheets

(51) Int. Cl.
- *F01D 25/22* (2006.01)
- *F02C 7/06* (2006.01)
- *F16C 17/12* (2006.01)
- *F16C 33/10* (2006.01)
- *F16C 29/02* (2006.01)
- *F01D 25/18* (2006.01)
- *F16C 37/00* (2006.01)

(52) U.S. Cl.
CPC ............... *F01D 25/22* (2013.01); *F02C 7/06* (2013.01); *F16C 17/12* (2013.01); *F16C 29/025* (2013.01); *F16C 33/1085* (2013.01); *F16C 37/002* (2013.01); *F05D 2240/50* (2013.01); *F05D 2240/60* (2013.01); *F16C 2360/24* (2013.01)

(58) Field of Classification Search
CPC ........... F05D 2240/60; F05D 2260/602; F04D 29/057; F04D 29/08
USPC ................. 384/99, 100, 129, 130, 286, 322; 415/111, 142, 170.1, 229; 60/785, 787
See application file for complete search history.

(56) References Cited

U.S. PATENT DOCUMENTS

| | | | |
|---|---|---|---|
| 4,370,106 A * | 1/1983 | Lauterbach | F16C 33/6659 417/407 |
| 5,058,697 A * | 10/1991 | Kervagoret | B62D 6/02 137/501 |
| 5,921,683 A | 7/1999 | Merritt et al. | |
| 5,932,940 A | 8/1999 | Epstein et al. | |
| 5,967,461 A * | 10/1999 | Farrington | B64D 13/06 244/118.5 |
| 6,035,627 A | 3/2000 | Liu | |
| 6,126,414 A * | 10/2000 | Koike | F01D 25/168 417/407 |
| 6,499,884 B1 * | 12/2002 | Svihla | F01D 25/162 384/138 |
| 6,767,182 B2 | 7/2004 | Coppola | |
| 6,798,079 B2 | 9/2004 | Nelson et al. | |
| 6,881,027 B2 | 4/2005 | Klaass et al. | |
| 6,966,191 B2 | 11/2005 | Fukutani et al. | |
| 7,118,321 B2 | 10/2006 | Macfadyen | |
| 7,251,942 B2 | 8/2007 | Dittmar et al. | |
| 7,484,932 B2 * | 2/2009 | Aguilar | F01D 11/003 29/888.024 |
| 7,562,519 B1 | 7/2009 | Harris et al. | |
| 7,748,209 B1 | 7/2010 | Schopf et al. | |
| 7,748,952 B1 | 7/2010 | Schopf et al. | |
| 7,836,694 B2 | 11/2010 | Arnold | |
| 8,310,076 B2 | 11/2012 | Jones et al. | |
| 8,328,535 B2 * | 12/2012 | Anschel | F04D 29/444 417/407 |
| 8,419,350 B2 * | 4/2013 | Just | F01D 5/04 415/111 |
| 8,572,963 B2 * | 11/2013 | Cuniberti | F01D 25/125 60/605.3 |
| 8,622,691 B2 * | 1/2014 | Eguchi | F01D 25/168 415/106 |
| 8,790,066 B2 * | 7/2014 | Gutknecht | F01D 25/16 415/1 |
| 8,955,794 B2 * | 2/2015 | Mackin | F02C 6/08 244/134 R |
| 9,494,189 B2 * | 11/2016 | Begin | F04D 29/057 |
| 9,714,610 B2 | 7/2017 | Snape et al. | |
| 2012/0057813 A1 * | 3/2012 | Von Oepen | A61F 2/82 384/114 |
| 2013/0192250 A1 * | 8/2013 | Glahn | F01D 11/04 60/785 |
| 2015/0069090 A1 * | 3/2015 | Van Der Hulst | F16N 13/02 417/401 |
| 2015/0275769 A1 | 10/2015 | Foutch et al. | |
| 2017/0146110 A1 * | 5/2017 | Galab | F16H 57/043 |
| 2017/0335769 A1 | 11/2017 | Boujida et al. | |
| 2018/0320550 A1 * | 11/2018 | Kenney | F01D 25/16 |

\* cited by examiner

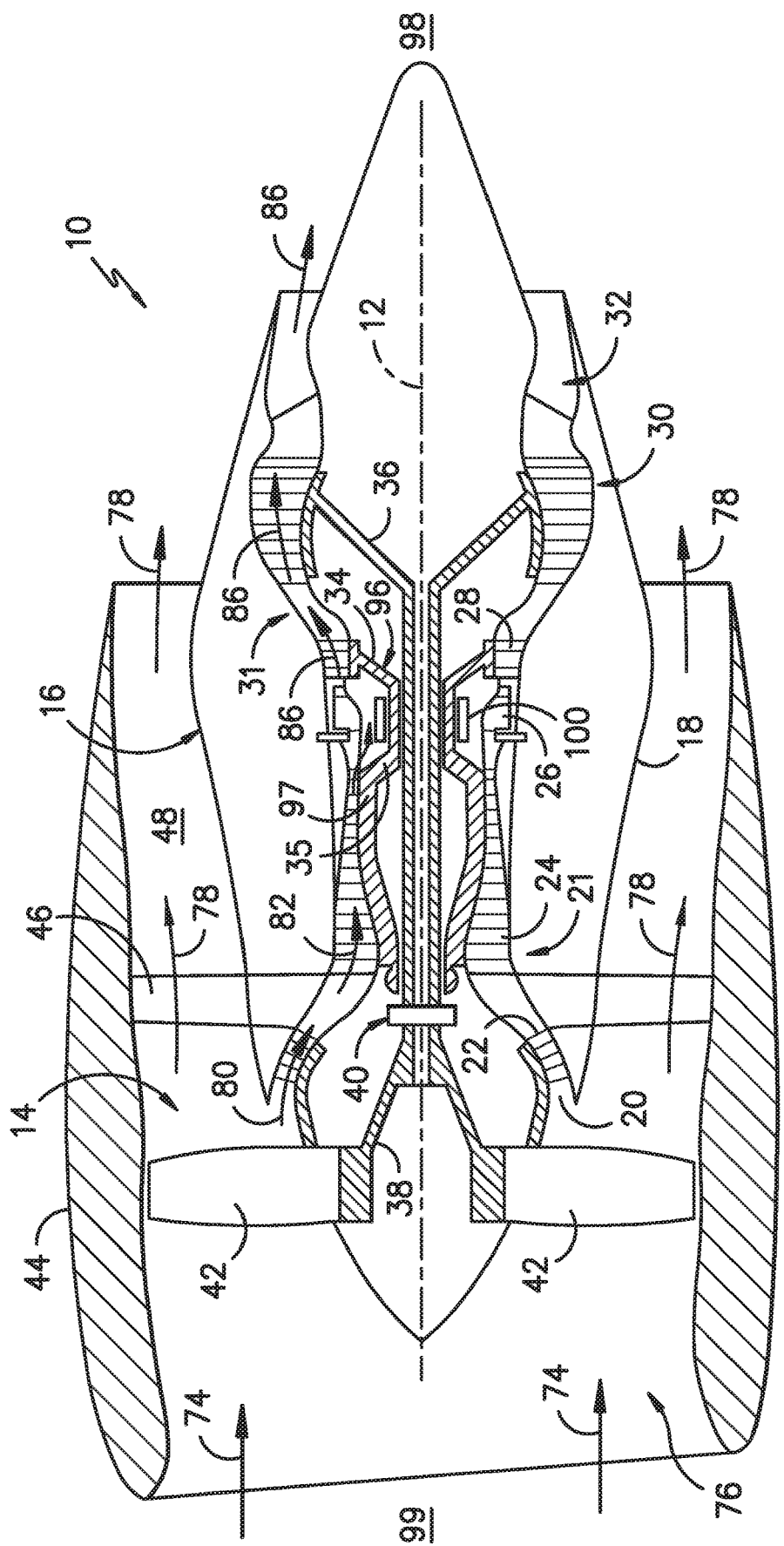
FIG. -1-

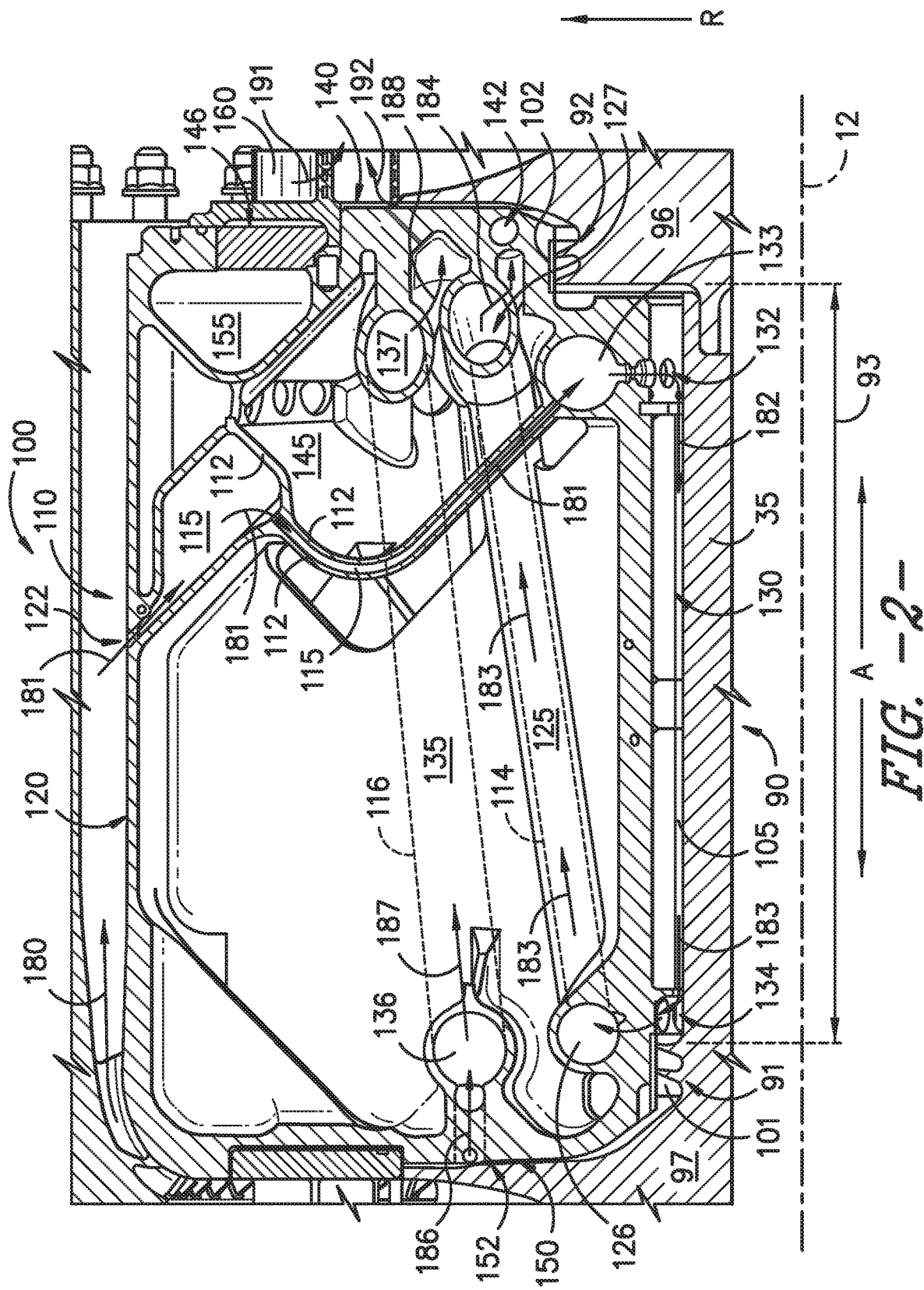
FIG. -2-

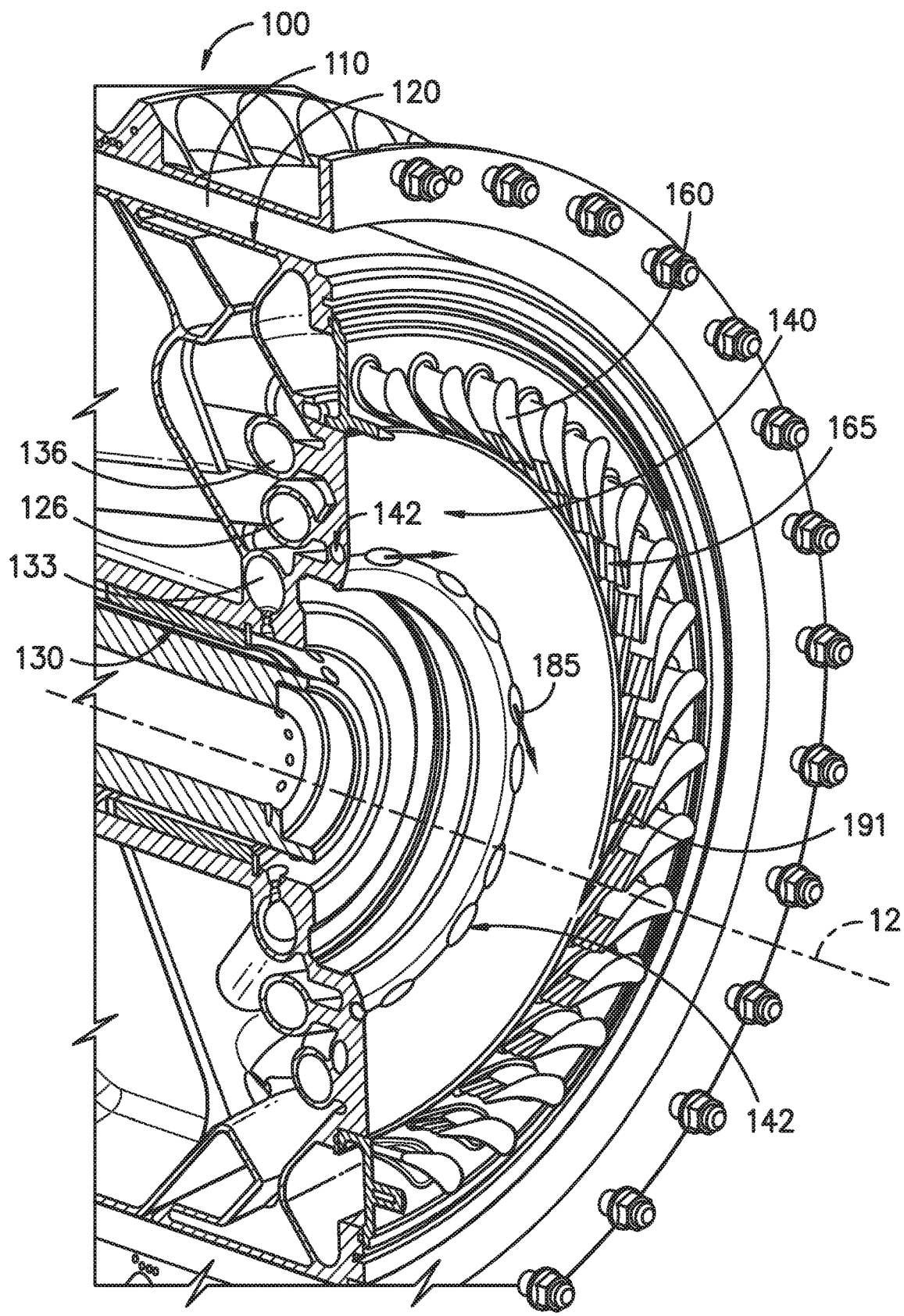
FIG. -3-

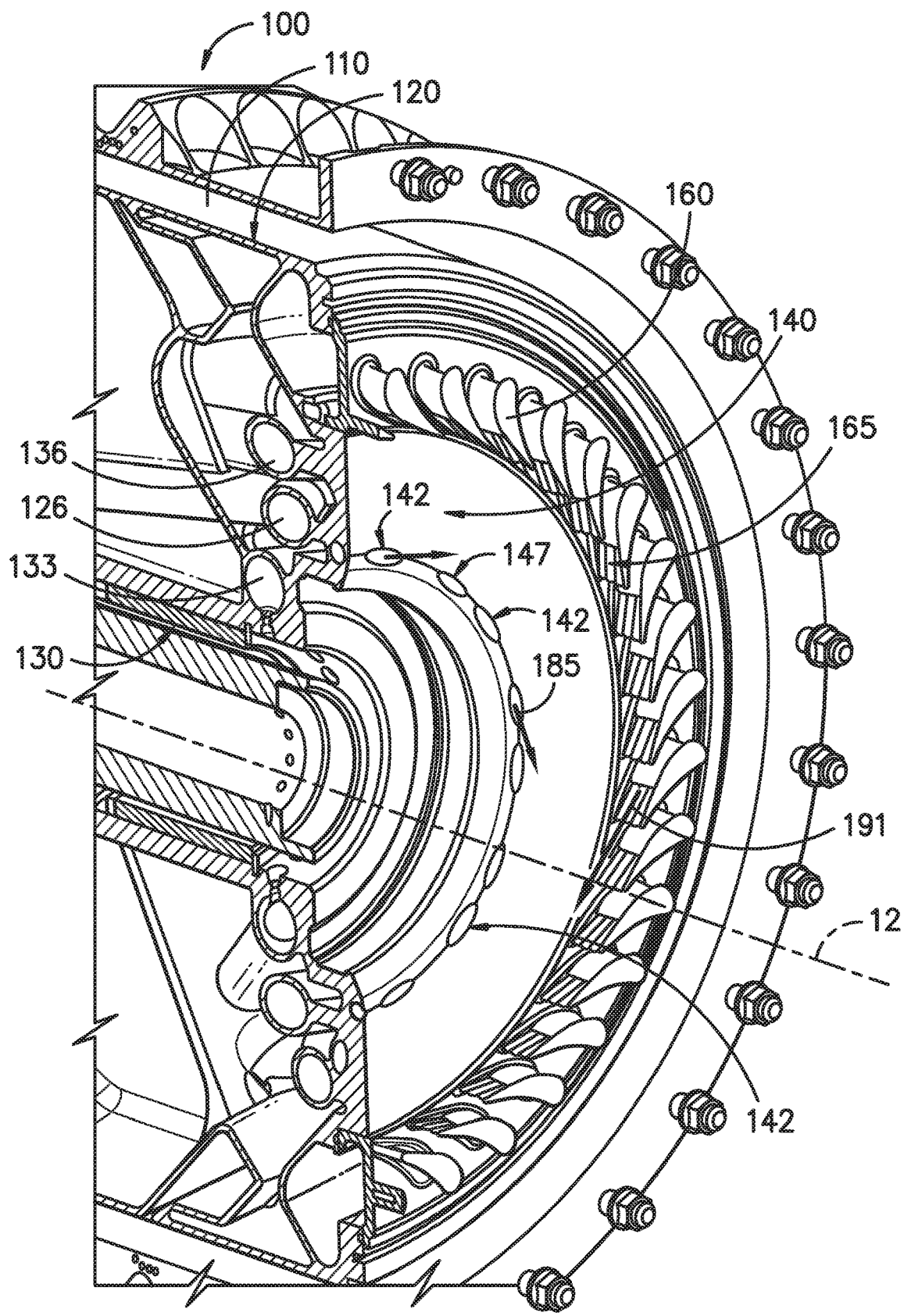
FIG. -4-

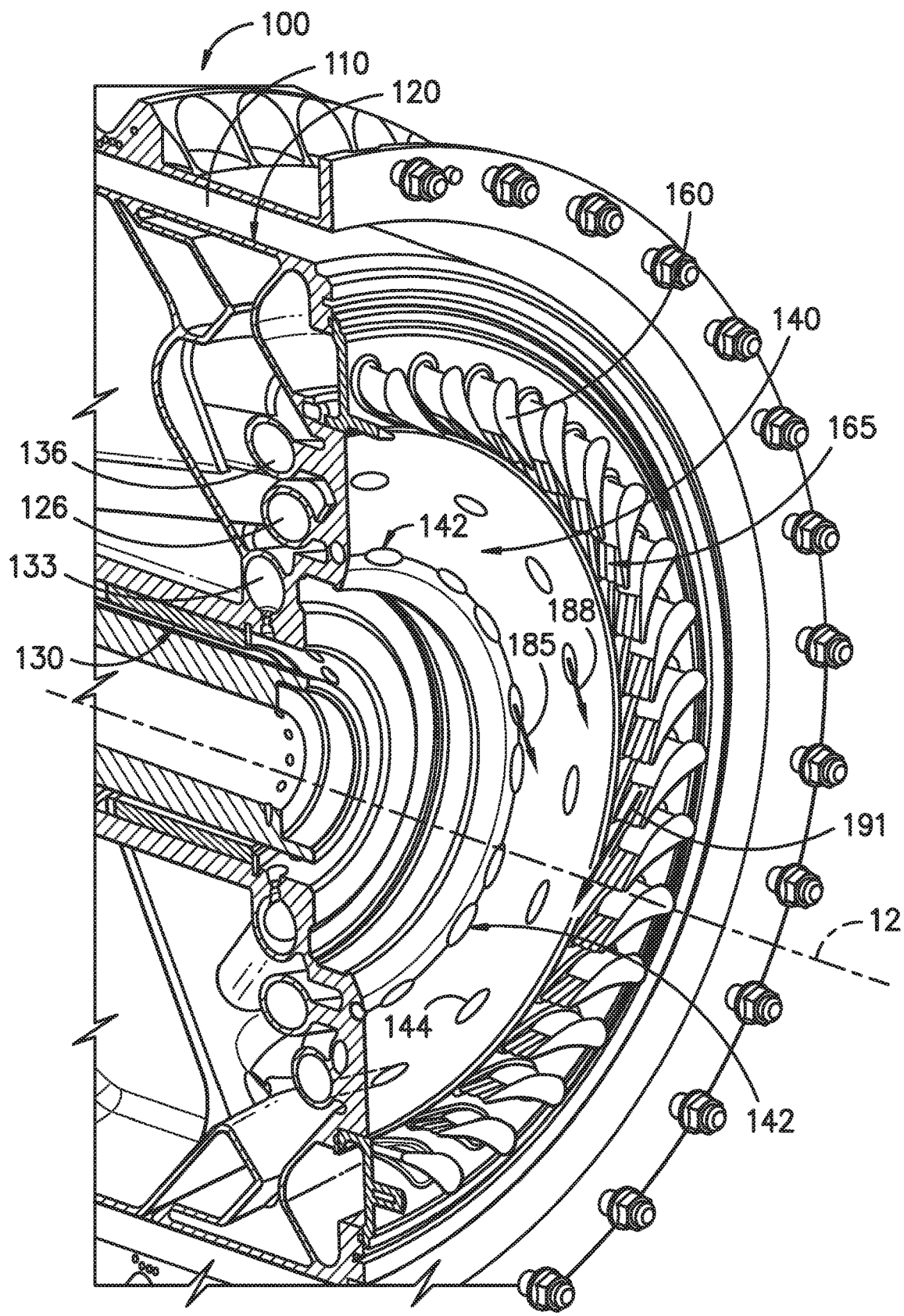
FIG. -5-

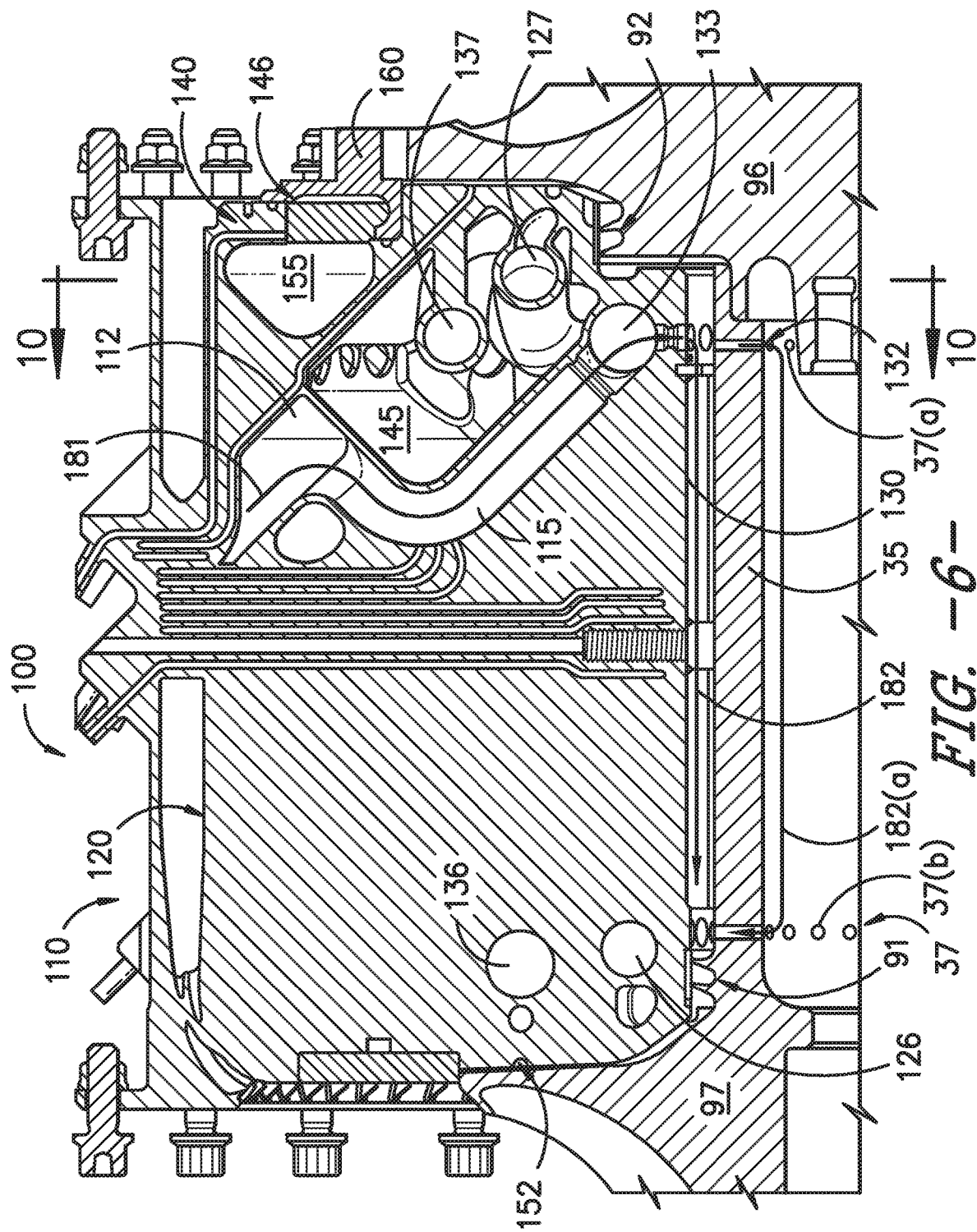
FIG. -6-

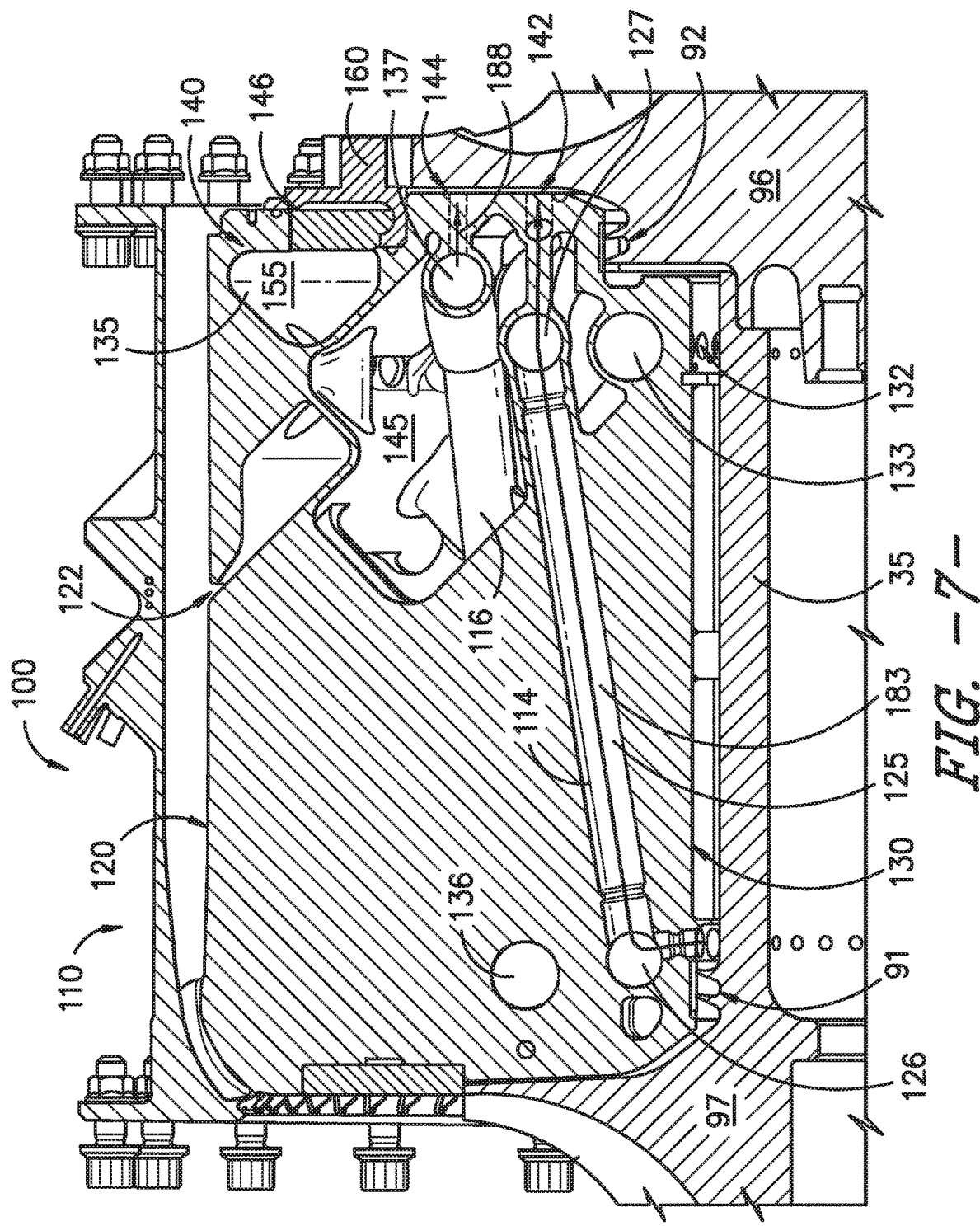
FIG. -7-

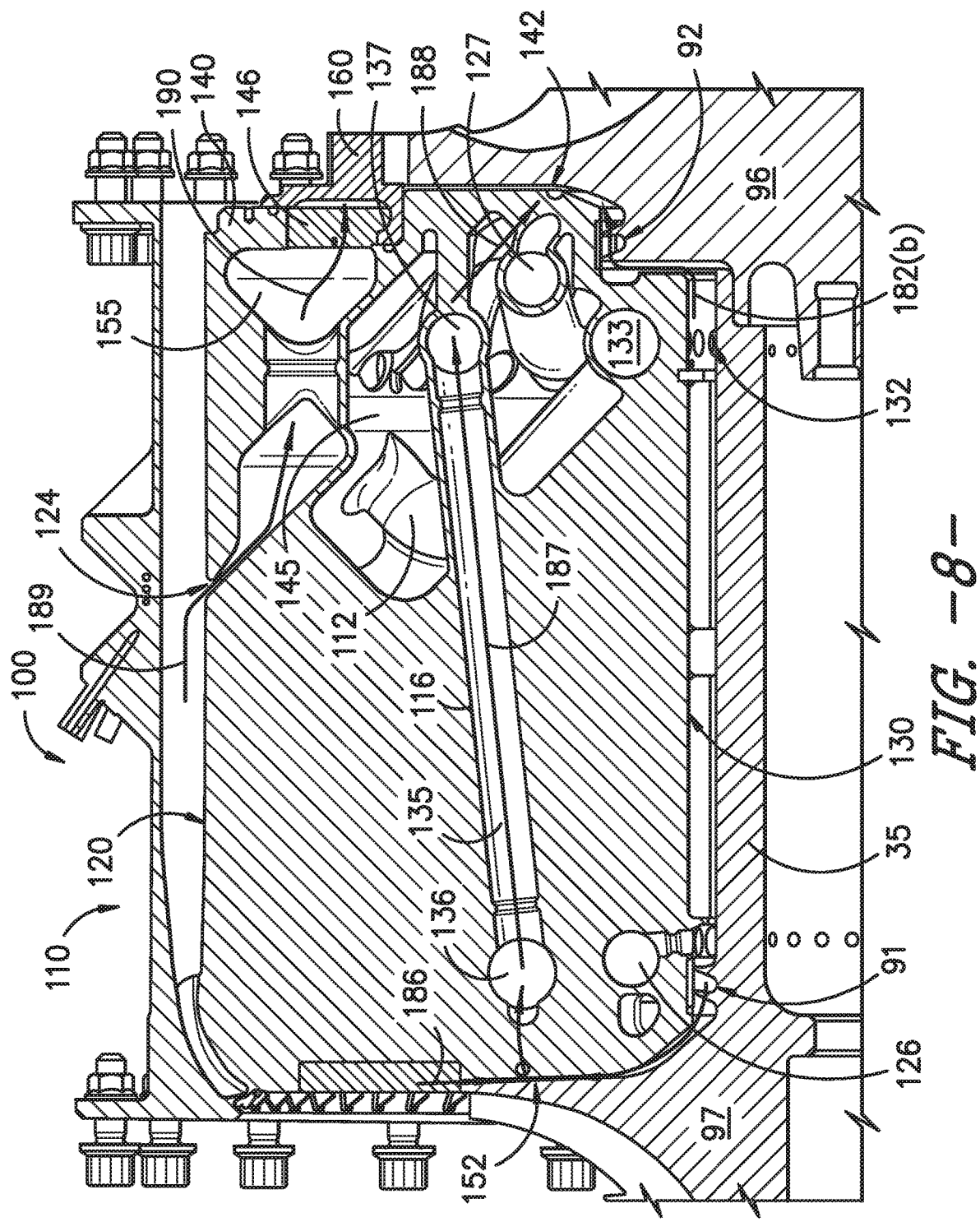
FIG. -8-

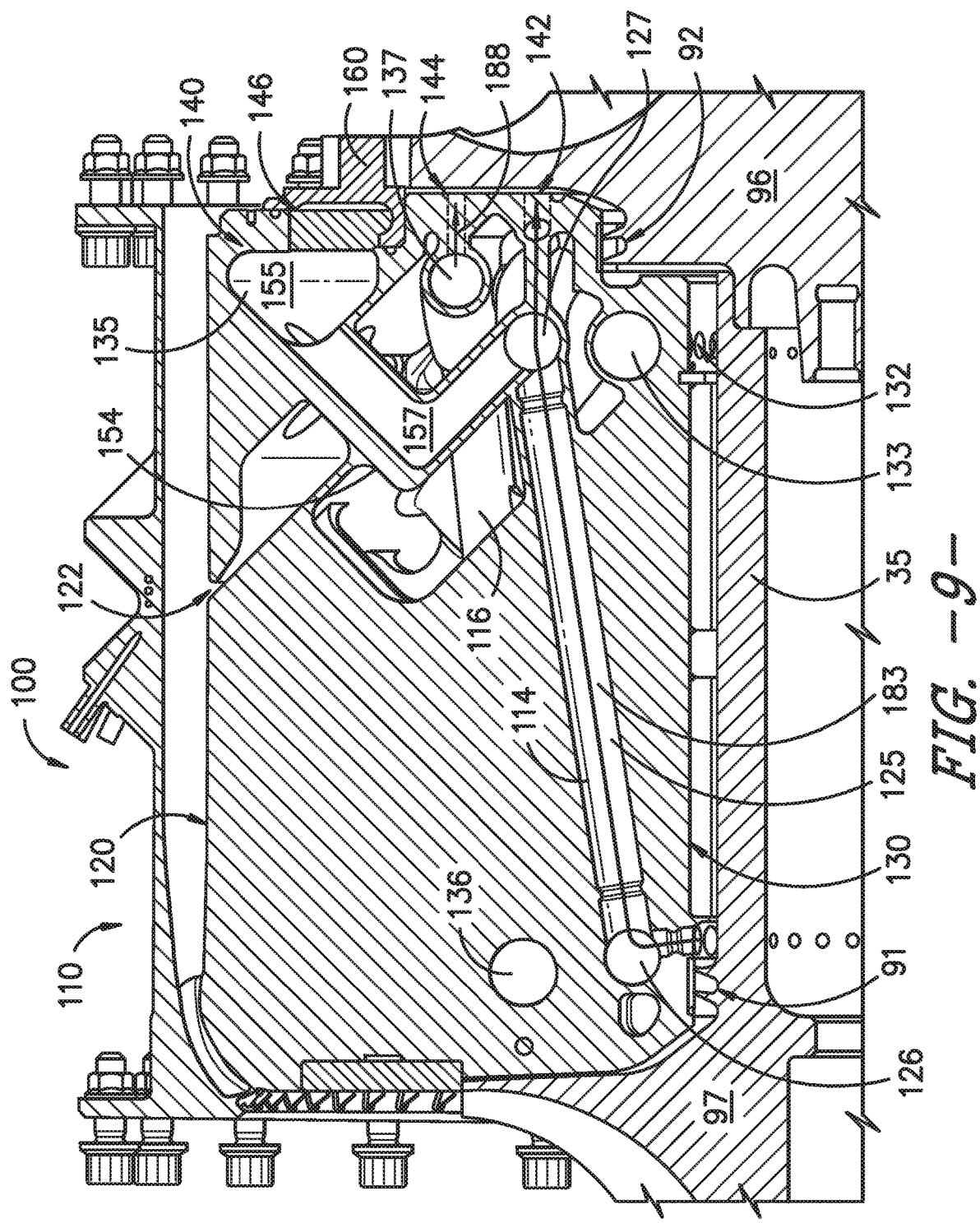
FIG. -9-

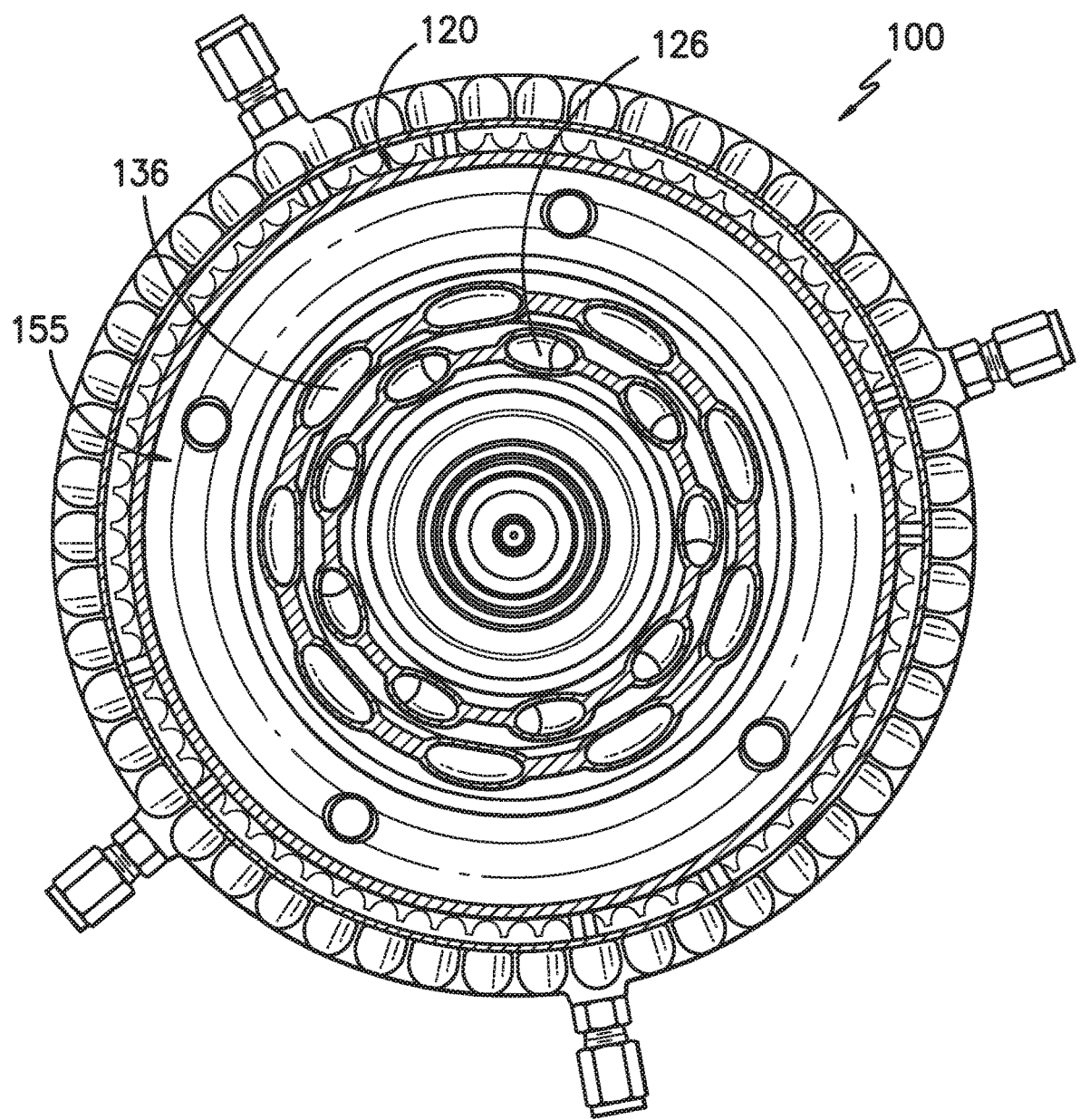
FIG. -10-

FLUID BEARING ASSEMBLY

FIELD

The present subject matter relates generally to fluid bearing assemblies. The present subject matter relates more specifically to fluid bearing assemblies for turbo machines.

BACKGROUND

Turbo machines, such as steam or gas turbine engines, include bearing assemblies between static and rotary components. Bearing assemblies, such as air bearing assemblies, may utilize fluid flows from the turbo machine to function, such as a portion of compressed air. However, utilizing compressed air to operate the bearing assembly removes energy from the thermodynamic cycle, thereby reducing turbo machine performance. As such, there is a need for a bearing assembly that more efficiently utilizes compressed air to operate the bearing assembly.

BRIEF DESCRIPTION

Aspects and advantages of the invention will be set forth in part in the following description, or may be obvious from the description, or may be learned through practice of the invention.

A bearing assembly including a body defining an outer surface, an inner surface, and an aft surface is generally provided. A first inlet opening is defined through the outer surface in fluid communication with a first internal passage defined by a first internal wall. The first internal passage is in fluid communication with a first outlet opening defined through the inner surface. A second inlet opening is defined through the inner surface in fluid communication with a second internal passage defined by a second internal wall. The second internal passage is in fluid communication with a second outlet opening defined through the aft surface.

In various embodiments, the inner surface defines a forward sealing surface and an aft sealing surface. The first outlet opening and the second inlet opening are defined through the inner surface between the forward sealing surface and the aft sealing surface. In one embodiment, the second inlet opening is defined through the inner surface within 35% of a distance from the forward sealing surface between the forward sealing surface and the aft sealing surface. In another embodiment, the first outlet opening is defined through the inner surface within 35% of a distance from the aft sealing surface between the forward sealing surface and the aft sealing surface.

In still various embodiments, the body further defines a forward surface. A third inlet opening is defined through the forward surface in fluid communication with a third internal passage defined by a third internal wall. In one embodiment, the third internal passage is in fluid communication with the second outlet opening defined through the aft surface. In other various embodiments, a third outlet opening is defined through the aft surface. The third internal passage is in fluid communication with the third outlet opening. In one embodiment, the third outlet opening is defined through the aft surface in adjacent circumferential arrangement with the second outlet opening. In another embodiment, the third outlet opening is defined through the aft surface in adjacent radial arrangement with the second outlet opening.

In one embodiment, the aft surface defines a plurality of the second outlet opening in adjacent circumferential arrangement. The second outlet opening is defined through the aft surface to dispose a flow of fluid along a tangential direction relative to the circumferential arrangement of the plurality of second outlet openings.

In another embodiment, at least a portion of the first internal wall defines a substantially circumferentially extended collector plenum in fluid communication with the first outlet opening.

In various embodiments, the second internal wall defining the second internal passage defines a substantially tubular conduit. In one embodiment, the inner surface defines a plurality of the second inlet opening in adjacent circumferential arrangement. Each second inlet opening is in fluid communication with the second internal passage.

Another aspect of the present disclosure is directed to a turbo machine including a rotor assembly that includes a shaft and an aft rotor. The shaft includes a forward seal and an aft seal. The turbo machine further includes a bearing assembly including an inner surface circumferentially surrounding the shaft of the rotor assembly, an outer surface radially outward of the inner surface, and an aft surface axially adjacent to the aft rotor. A first inlet opening is defined through the outer surface in fluid communication with a first internal passage defined by a first internal wall. The first internal passage is in fluid communication with a first outlet opening defined through the inner surface. A second inlet opening is defined through the inner surface in fluid communication with a second internal passage defined by a second internal wall. The second internal passage is in fluid communication with a second outlet opening defined through the aft surface.

In one embodiment, the first outlet opening is defined proximate to an aft seal interface. The second inlet opening is defined forward of the first outlet opening proximate to a forward seal interface. The first outlet opening and the second inlet opening are each defined at a distance between the forward seal interface and the aft seal interface.

In various embodiments, the bearing assembly further defines a third inlet opening through a forward surface. The third inlet opening is forward of the forward seal interface. In still various embodiments, the third inlet opening is in fluid communication with a third internal passage defined by a third internal wall. In one embodiment, the third internal passage is in fluid communication with the second outlet opening defined through the aft surface. In another embodiment, a third outlet opening is defined through the aft surface axially adjacent to the aft rotor of the rotor assembly. The third internal passage is in fluid communication with the third outlet opening.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross sectional view of an exemplary turbo machine into which exemplary embodiments of a bearing assembly according to an aspect of the present disclosure may be disposed;

FIG. 2 is a cross sectional view of an exemplary embodiment of the bearing assembly of FIG. 1 according to an aspect of the present disclosure;

FIGS. 3-5 are perspective views of exemplary embodiments of the bearing assembly according to aspects of the present disclosure;

FIGS. 6-9 are cross sectional views of exemplary embodiments of the bearing assembly generally provided in regard to FIG. 2; and FIG. 10 is a cutaway axial view of the bearing assembly provided in regard to FIG. 6.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a bearing assembly that more efficiently utilizes compressed air to operate the bearing assembly and the turbo machine are generally provided. Embodiments of the bearing assembly and turbo machine shown and described herein may define a fluid bearing in which fluid (e.g., air) is scavenged and directed through the bearing assembly to provide a fluid film between rotary members and the bearing assembly. Embodiments of the bearing assembly further provide cooling for the bearing assembly and one or more rotary or static components at a hot section (e.g., turbine section) adjacent to the bearing assembly. For example, the bearing assembly may generally define one or more cooling circuits to provide a cooling or purge airflow to a radial in-flow turbine disk of the turbine section. Additionally, the cooling circuit may be defined such as to generate cross-flow cooling.

Embodiments of the bearing assembly generally provided may decrease an amount of air extracted from the aero-thermodynamic cycle of the turbo machine, thereby improving turbo machine efficiency while performing bearing functions. Additionally, the bearing assembly may further improve turbo machine efficiency via utilizing substantially the same air for providing a bearing surface as also providing cooling to the hot section of the turbo machine. Additionally, or alternatively, the bearing assembly may enable a higher bearing/cooling fluid temperature, thereby decreasing performance losses related to cooling the air or from extracting lower-energy (e.g., lower pressure) air. Still further, extracting higher temperature air may improve turbo machine efficiency via reducing the need for heat exchanger or cooling systems, thereby improving weight, power output, and power/weight ratios.

Referring now to the drawings, FIG. 1 is a schematic partially cross-sectioned side view of an exemplary turbo machine 10 herein referred to as "engine 10" as may incorporate various embodiments of the present invention. Although further described herein as a turbo machine, the engine 10 may define a turbofan, turboshaft, turboprop, or turbojet gas or steam turbine engine, including marine and industrial engines and auxiliary power units. As shown in FIG. 1, the engine 10 has a longitudinal or axial centerline axis 12 that extends therethrough for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Referring now to FIG. 2, in conjunction with FIGS. 6-8, cross sectional views of an exemplary embodiment of the bearing assembly 100 are generally provided. The bearing assembly 100 includes a body 110 defining an outer surface 120, an inner surface 130, and an aft surface 140. The inner surface 130 is defined substantially circumferentially around the axial centerline 12 of the engine 10. A first inlet opening 122 is defined through the outer surface 120. A first internal passage 115 is defined within the body 110 via a first internal wall 112. For example, the first internal wall 112 may define a substantially tubular passage. As another example, the first internal wall 112 may define substantially frusto-conical, polygonal, oblong, or variable cross sectional areas such as to define other passage geometries. The first internal passage 115 is in fluid communication with the first inlet opening 122. A first outlet opening 132 is defined through the inner surface 130. The first internal passage 115 is further in fluid communication with the first outlet opening 132.

In various embodiments, the body 110 defines a first collector 133 between the first internal passage 115 and the first outlet opening 132. In one embodiment, the first collector 133 is extended at least partially along a circumferential direction through the body 110 of the bearing assembly 100. The first collector 133 may be in fluid communication with a plurality of circumferentially arranged first outlet openings 132 such as to normalize a pressure value from the plurality of first outlet openings 132. The first collector 133 may further be in fluid communication with a plurality of circumferentially arranged first internal passages 115 each defined by a plurality of circumferentially arranged first internal walls 112.

The first outlet opening 132 is defined radially adjacent to the shaft 35 of the rotor assembly 90. The rotor assembly 90 and the bearing assembly 100 together define a forward seal interface 91 and an aft seal interface 92. In various embodiments, one or more of the seal interfaces 91, 92 extended to a sealing surface at the bearing assembly 100. For example, the bearing assembly 100 may define at the inner surface 130 a forward sealing surface 101 and an aft sealing surface 102. The sealing surfaces 101, 102 may each be configured to enable or allow a seal at the rotor assembly 90 to at least partially contact the inner surface 130 of the bearing assembly 100. In various embodiments, the seal interfaces 91, 92 may define a knife-edge seal (e.g., such as generally depicted in FIG. 2), a carbon seal, a face seal, a brush seal, or another suitable seal type, or combinations thereof.

The bearing assembly 100 further defines a second inlet opening 134 defined through the inner surface 130. A second internal passage 125 is defined within the body 110 via a second internal wall 114. The second inlet opening 134 is in fluid communication with the second internal passage 125. The aft surface 140 defines a second outlet opening 142 therethrough. The second outlet opening 142 is in fluid communication with the second internal passage 125. In various embodiments, the second internal wall 114 defining the second internal passage 125 defines a substantially tubular conduit.

In various embodiments, the body 110 defines a second collector 126 between the second internal passage 125 and the second inlet opening 134. In one embodiment, the second collector 126 is extended at least partially along a circumferential direction through the body 110 of the bearing assembly 100. The second collector 126 may be in fluid communication with a plurality of circumferentially arranged second inlet openings 134 such as to normalize a pressure value from the plurality of second inlet openings 134. The second collector 126 may further be in fluid communication with a plurality of circumferentially arranged second internal passages 125 each defined by a plurality of circumferentially arranged second internal walls 114.

In still various embodiments, the body 110 defines a first plenum 127 between the second internal passage 125 and the second outlet opening 142 and/or third outlet opening 144. In one embodiment, the first plenum 127 is extended at least partially along a circumferential direction through the body 110 of the bearing assembly 100. The first plenum 127 may be in fluid communication with a plurality of circumferentially arranged second internal passages 125 each defined by a plurality of circumferentially arranged second internal walls 114 such as to normalize a pressure value from the plurality of second internal passages 125.

In another embodiment, such as depicted in regard to FIG. 10, the body 110 of the bearing assembly 100 may define a plurality of first plenum 127 in circumferential arrangement. Each first plenum 127 may be in fluid communication with one or more of the second internal passages 125 (FIG. 2, FIGS. 6-9) defined in circumferentially adjacent arrangement of second internal walls 114.

In another embodiment, such as depicted in regard to FIG. 10, the body 110 of the bearing assembly 100 may define a plurality of second plenum 127 in circumferential arrangement. Each second plenum 127 may be in fluid communication with one or more of the second internal passages 125 (FIG. 2, FIGS. 6-9) defined in circumferentially adjacent arrangement of second internal walls 114.

The seal interfaces 91, 92 together define a first pressure cavity 105 between the inner surface 130 of the bearing assembly 100, the rotor assembly 90, and the seal interfaces 91, 92. The first outlet opening 132 and the second inlet opening 134 are each defined within the first pressure cavity 105 between the seal interfaces 91, 92. More specifically, the first outlet opening 132 is defined proximate to the aft seal interface 92 and the second inlet opening 134 is defined proximate to the forward seal interface 91. Stated alternatively, the first outlet opening 132 is defined aft of the second inlet opening 134.

In various embodiments, the forward seal interface 91 and the aft seal interface 92 are separated along the axial direction A by a distance 93. The first outlet opening 132 and the second inlet opening 134 are each defined within the distance 93 between the seal interfaces 91, 92. In one embodiment, the first outlet opening 132 is defined within 50% of the distance 93 from the aft seal interface 92. In another embodiment, the first outlet opening 132 is defined within 35% of the distance 93 from the aft seal interface 92. In still another embodiment, the first outlet opening 132 is defined within 10% of the distance 93 from the aft seal interface 92.

In still other embodiments, the second inlet opening 134 is defined within 50% of the distance 93 from the forward seal interface 91. In another embodiment, the second inlet opening 134 is defined within 35% of the distance 93 from the forward seal interface 91. In still another embodiment, the second inlet opening 134 is defined within 10% of the distance 93 from the forward seal interface 91.

Referring now to FIGS. 1-2 and FIGS. 6-8, during operation of the engine 10, a portion of the compressed air 82, such as depicted in FIG. 1, is directed to the bearing assembly 100, such as shown schematically as air 180 in FIG. 2. At least a portion of the air 180 is directed into the bearing assembly 100 through the first inlet opening 122, shown schematically as air 181. The air 181 is directed through the first internal passage 115 and egresses the bearing assembly 100 into the first pressure cavity 105 through the first outlet opening 132, such as shown schematically as air 182. The air 182 flows through the second inlet opening 134 (e.g., from aft proximate to the aft sealing interface 92 forward toward the forward sealing interface 91) into the second internal passage 125, such as shown schematically as air 183. The air 183 flows through the second internal passage 125 and egresses the bearing assembly 100 through the second outlet opening 142, such as shown schematically by arrows 185.

In one embodiment, such as generally shown in regard to FIG. 6, at least a portion of the air 182 between the bearing assembly 100 and the shaft 35 may flow internally through the shaft 35 and egress into the bearing assembly 100 via the second inlet opening 134, such as depicted as air 182(a) flowing through a shaft opening 37. In various embodiments, the shaft opening 37 is defined at the shaft 35 corresponding to the distance 93 shown and described in regard to the first outlet opening 132, the second inlet opening 134, or both. In one embodiment, the shaft opening 37 may include a first shaft opening 37(a) disposed substantially radially adjacent to the first outlet opening 132 at the bearing assembly 100. For example, the first shaft opening 37(a) may be defined at the shaft 35 corresponding to the distance 93 within which the first outlet opening 132 may be defined at the bearing assembly 100. In another embodiment, the shaft opening 37 may further include a second shaft opening 37(b) disposed substantially radially adjacent to the second inlet opening 134. For example, the second shaft opening 37(b) may be defined at the shaft 35 corresponding to the distance 93 within which the second inlet opening 134 may be defined at the bearing assembly 100.

In another embodiment, at least a portion of the air 182 may additionally, or alternatively, egress across the aft seal surface 92, such as depicted in FIG. 8 as air 182(b). The air 182(b) may further mix with the air egressing the second outlet opening 142 (e.g., air 185 in FIG. 2) to provide cooling to the aft rotor 96.

In one embodiment, such as generally shown in regard to FIG. 6, at least a portion of the air 182 between the bearing assembly 100 and the shaft 35 may flow internally through the shaft 35 and egress into the bearing assembly 100 via the second inlet opening 134, such as depicted via arrows 182(a) flowing through a shaft opening 37. In various embodiments, the shaft opening 37 is defined at the shaft 35 corresponding to the distance 93 shown and described in regard to the first outlet opening 132, the second inlet opening 134, or both. In one embodiment, the shaft opening 37 may include a first shaft opening 37(a) disposed substantially radially adjacent to the first outlet opening 132 at the bearing assembly 100. For example, the first shaft opening 37(a) may be defined at the shaft 35 corresponding to the distance 93 within which the first outlet opening 132 may be defined at the bearing assembly 100. In another embodiment, the shaft opening 37 may further include a second shaft opening 37(b) disposed substantially radially adjacent to the second inlet opening 134. For example, the second shaft opening 37(b) may be defined at the shaft 35 corresponding to the distance 93 within which the second inlet opening 134 may be defined at the bearing assembly 100.

In another embodiment, at least a portion of the air 182 may additionally, or alternatively, egress across the aft seal surface 92, such as depicted via arrows 182(b) (FIG. 8). The air 182(b) may further mix with the air egressing the second outlet opening 142 (e.g., air 185 in FIG. 2) to provide cooling to the aft rotor 96.

In various embodiments, the first internal passage 115, the first pressure cavity 105, and the second internal passage 125 together define a substantially fluidly coupled circuit through which the compressed air 180 is provided between the inner surface 130 of the bearing assembly 100 and the rotor assembly 90. The compressed air 180 is generally provided as a cooling fluid to the rotor assembly 90. The compressed air 180 may more specifically be provided as cooling fluid to an aft rotor 96 of the rotor assembly 90. The aft rotor 96 is extended along the radial direction R from the shaft 35 and adjacent along the axial direction A to the aft surface 140 of the bearing assembly 100. As such, the compressed air 185 provides cooling to the aft rotor 96 as the compressed air 185 egresses through the second outlet opening 142 in thermal communication with the aft rotor 96.

In various embodiments, the bearing assembly 100 defines a hydrodynamic or hydrostatic bearing configuration. For example, the bearing assembly 100 defining a hydrodynamic or hydrostatic bearing assembly may include one or more of a foil bearing, a journal bearing, an air bearing, a tilt-pad fluid bearing, or another suitable configuration, in which the compressed air 180 provides cooling to the bearing assembly 100.

In still various embodiments, the bearing assembly 100 defining a hydrostatic bearing configuration may further provide the compressed air 180 as a fluid film between the bearing assembly 100 and the shaft 35. The compressed air 180 may be provided to the bearing assembly 100 to generate a fluid film and cooling flow between the rotor assembly 90, such as at the shaft 35, and inner surface 130 of the bearing assembly 100.

Embodiments of the bearing assembly 100 and engine 10 generally provided improve efficiency by utilizing the compressed air 180 as a cooling fluid at the bearing assembly 100 and the rotor assembly 90. In various embodiments, the compressed air 180 may further provide a fluid film between the bearing assembly 100 and the shaft 35 of the rotor assembly 90 (i.e., air 182) and as cooling fluid at the aft rotor 96 of the rotor assembly 90. Egressing the air 185 through the second outlet opening 142 may further mitigate hot gas ingestion into the bearing assembly 100 (i.e., ingestion of combustion gases 86 in FIG. 1). Additionally, the bearing assembly 100 mitigates performance losses at the engine 10 due to utilizing separate sources for fluid film and cooling fluid (e.g., utilizing less bleed air from the compressor section 21).

Referring still to FIG. 2 and FIGS. 6-8, and the exemplary perspective views generally provided in FIGS. 3-5, the body 110 of the bearing assembly 100 further defines a forward surface 150. Each of FIG. 2 and FIGS. 6-8 generally depict different circumferential planes along which each axial view is generally provided. A third inlet opening 152 is defined through the forward surface 150. The body 110 of the bearing assembly 100 further defines a third internal passage 135 defined by a third internal wall 116 within the body 110. The third internal passage 135 is in fluid communication with the third inlet opening 152. In various embodiments, the third internal wall 116 defines a substantially tubular conduit.

In various embodiments, the body 110 defines a third collector 136 between the third internal passage 135 and the third inlet opening 152. In one embodiment, the third collector 136 is extended at least partially along a circumferential direction through the body 110 of the bearing assembly 100. The third collector 136 may be in fluid communication with a plurality of circumferentially arranged third inlet openings 152 such as to normalize a pressure value from the plurality of third inlet openings 152. The third collector 136 may further be in fluid communication with a plurality of circumferentially arranged third internal passages 135 each defined by a plurality of circumferentially arranged third internal walls 116.

In still various embodiments, the body 110 defines a second plenum 137 between the third internal passage 135 and the second outlet opening 142 and/or third outlet opening 144. In one embodiment, the second plenum 137 is extended at least partially along a circumferential direction through the body 110 of the bearing assembly 100. The second plenum 137 may be in fluid communication with a plurality of circumferentially arranged third internal passages 135 each defined by a plurality of circumferentially arranged third internal walls 116 such as to normalize a pressure value from the plurality of third internal passages 135.

In another embodiment, such as depicted in regard to FIG. 10, the body 110 of the bearing assembly 100 may define a plurality of second plenum 137 in circumferential arrangement. Each first plenum 137 may be in fluid communication with one or more of the third internal passages 135 (FIG. 2, FIGS. 6-9) defined in circumferentially adjacent arrangement of third internal walls 116.

Referring now to FIGS. 2-3, during operation of the engine 10, a portion of the compressed air 82, such as depicted in FIG. 1, is directed into the bearing assembly 100 via the third inlet opening 152, such as shown schematically as air 186. The air 186 is directed through the third internal passage 135 and egresses the bearing assembly 100 through the second outlet opening 142, such as shown schematically as air 187. As such, the third internal passage 135 is in fluid communication with the second outlet opening 142. In one embodiment, the bearing assembly 100 may define within the body 100 a collector plenum 145. In various embodiments, the collector plenum 145 may be extended at least partially circumferentially within the body 100. The second internal passage 125 and the third internal passage 135 may together be disposed in fluid communication via the collector plenum 145. For example, the flow of air 183 through the second internal passage 125 may egress into the collector plenum 145 then through second outlet opening 142, such as shown schematically by arrows 185. The flow of air 187 through the third internal passage 135 may egress into the collector plenum 145 then through the second outlet opening 142, such as shown schematically as air 185.

Referring now to FIGS. 1-2 and FIGS. 6-8, during operation of the engine 10, a portion of the compressed air 82 (FIG. 1) is directed to the bearing assembly 100, such as shown schematically by arrows 180 (FIG. 2). The compressed air 180 (FIG. 2) is directed into the bearing assembly 100 through the first inlet opening 122, shown schematically by arrows 181. The air 181 is directed through the first internal passage 115 and egresses the bearing assembly 100 into the first pressure cavity 105 through the first outlet opening 132, such as shown schematically by arrows 182. The air 182 flows through the second inlet opening 134 (e.g., from aft proximate to the aft sealing interface 92 forward toward the forward sealing interface 91) into the second internal passage 125, such as shown schematically by arrows 183. The air 183 flows through the second internal passage 125 and egresses the bearing assembly 100 through the second outlet opening 142, such as shown schematically by arrows 185.

Referring now to FIGS. 4-5, perspective views of embodiments of the bearing assembly 100 are further provided. The embodiments generally shown in regard to FIGS. 4-5 are configured substantially similarly as shown and described in regard to FIG. 3. However, in FIGS. 4-5, the bearing assembly 100 further defines a third outlet opening 144 defined through the aft surface 140. The third internal passage 135 is in fluid communication with the third outlet opening 144 (further shown in regard to FIG. 7). The third outlet opening 144 egresses the flow of air 187 from the third internal passage 135, such as depicted as air 185(a). In various embodiments, the third outlet opening 144 egresses the flow of air 185(a) from the third internal passage 135 fluidly segregated from the flow of air 185 egressed from the second internal passage 125 through the second outlet opening 142.

Referring to FIG. 4, in one embodiment, the third outlet opening 144 is defined through the aft surface 140 of the body 110 in adjacent circumferential arrangement with the second outlet opening 142.

Referring to FIG. 5, in another embodiment, the third outlet opening 144 is defined through the aft surface 140 of the body 110 in adjacent radial arrangement with the second outlet opening 142. For example, such as shown in FIG. 5, the third outlet opening 144 is defined through the aft surface 140 radially outward of the second outlet opening 142.

In various embodiments, such as generally shown in regard to FIGS. 7-8, the flow of air 187 through the third internal passage 135 may egress the bearing assembly 100 via the third outlet opening 144, such as depicted via arrows 188.

Referring back to FIGS. 3-5, in various embodiments, the aft surface 140 defines a plurality of the second outlet opening 142 in adjacent circumferential arrangement relative to the axial centerline 12. The second outlet opening 142 is defined through the aft surface 140 to dispose a flow of fluid, shown schematically as air 185, substantially along a tangential direction relative to the circumferential arrangement of the plurality of second outlet openings 142. In various embodiments, the second outlet opening 142 is extended tangentially through the aft surface 140 to dispose the flow of air 185 substantially along a tangential direction. For example, the second outlet opening 142 is extended along a circumferential direction from a proximate end at the collector plenum 145 to a distal end outside of the body 110 of the bearing assembly 100.

Referring back to FIG. 2, FIGS. 6-8, and the exemplary cutaway view of the bearing assembly 100 depicted in FIG. 10 along plane 10-10 (FIG. 6), the body 110 of the bearing assembly 100 further defines an aft cooling cavity 155. In various embodiments, the aft cooling cavity 155 may be defined adjacent to the aft surface 140 and between one or more of the first internal wall 112 within the body 110. Referring to FIGS. 3-5, the bearing assembly 100 may further include a plurality of vanes 160 coupled to the aft surface 140 of the body 110. The plurality of vanes 160 is disposed in circumferentially adjacent arrangement along the aft surface 140. In various embodiments, the plurality of vanes 160 is disposed axially adjacent to the aft rotor 96 (e.g., turbine rotor). Referring to FIG. 8, in conjunction with FIGS. 3-5, the outer surface 120 of the bearing assembly 100 may further define an aft cooling inlet 124 through the outer surface 120. In one embodiment, the aft cooling inlet 124 may be disposed in adjacent circumferential arrangement with the first inlet opening 122 (e.g., FIG. 8 generally depicting an axial cross section along a circumferential plane different from FIGS. 2 and 6-7). The aft cooling inlet 124 is in fluid communication with the aft cooling cavity 155 defined within the body.

In one embodiment, during operation of the engine, a flow of air, depicted via arrows 189 (FIG. 8) enters the aft cooling cavity 155 via the aft cooling inlet 124. The bearing assembly 100 further defines an aft cooling exit 146 through the aft surface 140 of the body 110. The aft cooling exit 146 is disposed axially adjacent to the plurality of vanes 160 coupled to the aft surface 140. The flow of air 189 in the aft cooling cavity 155 egresses from the body 110 via the aft cooling exit 146, such as depicted via arrows 190 (FIG. 8). The plurality of vanes 160 further orients or disposes the flow or air 190 from the aft cooling cavity 155 along a tangential direction relative to the axial centerline 12 via a plurality of vane openings 165 defined in the vanes 160 (such as depicted via arrows 191 in FIGS. 3-5). The flow of air 191 (FIG. 3) from the aft cooling cavity 155 may generally provide thermal attenuation to the aft rotor 96 of the engine 10. In various embodiments, the flow of air 191 (FIG. 3) from the aft cooling cavity 155 may further provide thermal attenuation (e.g., cooling) to the vane 160.

Referring back to FIG. 2, in various embodiments, a portion of air may egress one or more of the second outlet opening 142 and/or the third outlet opening 144, such as depicted via arrows 192. Additionally, or alternatively, the air may egress through the aft cooling exit 146 such as to cool the vanes 160. As such, a portion of air utilized for the bearing function (e.g., air 182 through internal passages 125, 135) may be further utilized to provide cooling to the aft rotor 96 via the plurality of vanes 160. Embodiments of the bearing assembly 100 provided herein enable selectively mixing air from a plurality of source pressures. For example, the air may enter the bearing assembly 100 via air 180, air 186, or both. A lower pressure source of the air may enable injection of a higher pressure bleed air (e.g., compressor bleed air) from a different source.

Various embodiments of the bearing assembly 100 shown and described herein may more efficiently utilize compressed air to operate the bearing assembly 100 and the engine 10. Embodiments of the bearing assembly 100 and the engine 10 shown and described herein may define a fluid bearing in which fluid (e.g., air) is scavenged and directed through the bearing assembly 100 (e.g., air 181, 182, 183, 185, 186, 187, 188, 189, 190) to provide a fluid film (e.g., 182) between the shaft 35 and the bearing assembly 100. Embodiments of the bearing assembly 100 further provide cooling for the bearing assembly 100 and one or more rotary or static components at a hot section (e.g., turbine section 31) adjacent to the bearing assembly 100, such as the aft rotor 96.

Embodiments of the bearing assembly 100 generally shown and described herein may be produced using one or more manufacturing methods known in the art, such as, but not limited to, via one or more processes known as additive manufacturing or 3D printing, machining processes, forgings, castings, etc., or combinations thereof, including unitary components or multiple components joined together via a bonding process (e.g., welding, brazing, adhesive, bonding, etc.), or mechanical fasteners (e.g., bolts, nuts, screws, rivets, tie rods, etc.), or other joining process. Alternatively, or additionally, various components of the bearing assembly 100 may be formed via a material removal process, such as, but not limited to, a machining process (e.g., cutting, milling, grinding, boring, etc.). Furthermore, the engine 10, or portions thereof, may be constructed of one or more materials suitable for gas turbine engines, such as, but not limited to, steel and steel alloys, nickel and nickel-based alloys, aluminum and aluminum alloys, titanium and titanium alloys, iron-based materials, composite materials (e.g., CMC, MMC, PMC materials, etc.), or combinations thereof.

Various embodiments of the bearing assembly 100 shown and described herein may be configured as a hydrodynamic or hydrostatic bearing assembly. The working fluid depicted flowing through and around the bearing assembly 100 (e.g., air 181, 182, 183, 185, 186, 187, 188, 189, 190) may further, or alternatively, include liquid or gaseous working fluids generally known by one skilled in the art, such as, but not limited to, a lubricant (e.g., oil or oil-based solution), a hydraulic fluid, a supercritical fluid, or combinations thereof.

Still other various embodiments of the bearing assembly 100 may be configured as a rolling bearing element assembly, including, but not limited to, a roller bearing, a tapered roller bearing, a ball bearing, a needle roller bearing, a gear bearing, or combinations thereof. For example, various embodiments of the bearing assembly 100 may dispose a rolling bearing element between the shaft 35 and the inner surface 130 of the bearing assembly 100. However, it should be appreciated that one skilled in the art may incorporate other embodiments of a rolling bearing element to various embodiments of the bearing assembly 100 shown and described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly, the bearing assembly comprising: a body defining an outer surface, an inner surface, and an aft surface, wherein a first inlet opening is defined through the outer surface in fluid communication with a first internal passage defined by a first internal wall, and wherein the first internal passage is in fluid communication with a first outlet opening defined through the inner surface, and further wherein a second inlet opening is defined through the inner surface in fluid communication with a second internal passage defined by a second internal wall, and wherein the second internal passage is in fluid communication with a second outlet opening defined through the aft surface.

2. The bearing assembly of claim 1, wherein the inner surface defines a forward sealing surface and an aft sealing surface, and wherein the first outlet opening and the second inlet opening are defined through the inner surface between the forward sealing surface and the aft sealing surface.

3. The bearing assembly of claim 2, wherein the second inlet opening is defined through the inner surface within 35% of a distance from the forward sealing surface between the forward sealing surface and the aft sealing surface.

4. The bearing assembly of claim 2, wherein the first outlet opening is defined through the inner surface within 35% of a distance from the aft sealing surface between the forward sealing surface and the aft sealing surface.

5. The bearing assembly of claim 1, wherein the body further defines a forward surface, and wherein a third inlet opening is defined through the forward surface in fluid communication with a third internal passage defined by a third internal wall.

6. The bearing assembly of claim 5, wherein the third internal passage is in fluid communication with the second outlet opening defined through the aft surface.

7. The bearing assembly of claim 5, wherein a third outlet opening is defined through the aft surface, and further wherein the third internal passage is in fluid communication with the third outlet opening.

8. The bearing assembly of claim 7, wherein the third outlet opening is defined through the aft surface in adjacent circumferential arrangement with the second outlet opening.

9. The bearing assembly of claim 7, wherein the third outlet opening is defined through the aft surface in adjacent radial arrangement with the second outlet opening.

10. The bearing assembly of claim 1, wherein the aft surface defines a plurality of the second outlet opening in adjacent circumferential arrangement.

11. The bearing assembly of claim 10, wherein the second outlet opening is defined through the aft surface to dispose a flow of fluid along a tangential direction relative to the circumferential arrangement of the plurality of second outlet openings.

12. The bearing assembly of claim 1, wherein at least a portion of the first internal wall defines a substantially circumferentially extended collector plenum in fluid communication with the first outlet opening.

13. The bearing assembly of claim 1, wherein the second internal wall defining the second internal passage defines a substantially tubular conduit.

14. The bearing assembly of claim 13, wherein the inner surface defines a plurality of the second inlet opening in adjacent circumferential arrangement, wherein each second inlet opening is in fluid communication with the second internal passage.

15. A turbo machine, the turbo machine comprising:
a rotor assembly comprising a shaft and an aft rotor, wherein the shaft defines a forward seal and an aft seal; and
a bearing assembly comprising an inner surface circumferentially surrounding the shaft of the rotor assembly, an outer surface radially outward of the inner surface, and an aft surface axially adjacent to the aft rotor, wherein a first inlet opening is defined through the outer surface in fluid communication with a first internal passage defined by a first internal wall, and wherein the first internal passage is in fluid communication with a first outlet opening defined through the inner surface, and further wherein a second inlet opening is defined through the inner surface in fluid communication with a second internal passage defined by a second internal wall, and wherein the second internal passage is in fluid communication with a second outlet opening defined through the aft surface.

16. The turbo machine of claim 15, wherein the first outlet opening is defined proximate to an aft seal interface, and further wherein the second inlet opening is defined forward of the first outlet opening proximate to a forward seal interface, and further wherein the first outlet opening and the second inlet opening are each defined at a distance between the forward seal interface and the aft seal interface.

17. The turbo machine of claim 15, wherein the bearing assembly further defines a third inlet opening through a forward surface, and wherein the third inlet opening is forward of the forward seal interface.

18. The turbo machine of claim 17, wherein the third inlet opening is in fluid communication with a third internal passage defined by a third internal wall.

19. The turbo machine of claim 18, wherein the third internal passage is in fluid communication with the second outlet opening defined through the aft surface.

20. The turbo machine of claim 18, wherein a third outlet opening is defined through the aft surface axially adjacent to the aft rotor of the rotor assembly, wherein the third internal passage is in fluid communication with the third outlet opening.

* * * * *